United States Patent [19]

Guardiani et al.

[11] Patent Number: 4,838,559
[45] Date of Patent: Jun. 13, 1989

[54] REACTOR COOLANT PUMP HYDROSTATIC SEALING ASSEMBLY WITH IMPROVED HYDRAULIC BALANCE

[75] Inventors: Richard F. Guardiani, Ohio Township, Allegheny County; Charles P. Nyilas, Monroeville, both of Pa.

[73] Assignee: Westinghouse Electric Corp., Pittsburgh, Pa.

[21] Appl. No.: 63,331

[22] Filed: Jun. 17, 1987

[51] Int. Cl.$^4$ .................. F16J 15/34; F16J 15/40
[52] U.S. Cl. .................................. 277/3; 277/27; 277/28; 277/81 R; 277/91
[58] Field of Search ............... 277/27, 29, 81 R, 28, 277/70, 71, 76, 73, 3, 74, 75, 91

[56] References Cited

U.S. PATENT DOCUMENTS

| | | | |
|---|---|---|---|
| 3,447,809 | 6/1969 | Marrujo et al. | 277/27 |
| 3,511,510 | 5/1970 | Linderboom | 277/27 |
| 3,522,948 | 8/1970 | MacCrum | 277/27 |
| 3,529,838 | 9/1970 | Singleton | 277/27 |
| 3,632,117 | 1/1972 | Villasor | 277/3 |
| 3,720,222 | 3/1973 | Andrews et al. | 137/154 |
| 3,949,996 | 4/1976 | Inoue et al. | 277/27 X |
| 4,183,540 | 1/1980 | Hytonen | 277/27 |
| 4,212,475 | 7/1980 | Sedy | 277/27 X |
| 4,275,891 | 6/1981 | Boes | 277/96.1 |
| 4,415,165 | 11/1983 | Martini | 277/27 |
| 4,427,620 | 1/1984 | Cook | 376/216 |
| 4,434,132 | 2/1984 | Cook | 376/259 |
| 4,511,149 | 4/1985 | Wiese | 277/27 X |

Primary Examiner—Allan N. Shoap

[57] ABSTRACT

A pump having a shaft and a housing containing pressurized fluid variable in pressure between pump startup and operation, employs a hydrostatic sealing assembly for sealably and rotatably mounting the shaft within the housing. The sealing assembly includes a runner mounted around the shaft for rotation therewith and a seal ring mounted to the stationary housing. The runner and seal ring have facing surfaces between which the pressurized fluid creates a flowing low pressure fluid film which prevents contact between the facing surfaces so long as a predetermined minimum leakrate is maintained therebetween. The seal ring has first and second surfaces facing in a direction opposite to that of its facing surface and in sealingly isolated relationship from one another. The first surface communicates with the pressurized fluid at supply pressure. A flow control device provided in the seal ring is automatically operable in response to the supply pressure level to open communication of the pressurized fluid supply pressure with the seal ring second surface at pump operation and to open communication of the fluid film low pressure with the seal ring second surface at pump startup. A lifting force thus imposed on the seal ring facing surface by the pressurized fluid is effectively balanced by a seating force imposed on the seal ring first and second surfaces at both pump startup and operation so that leakrates are produced between the facing surfaces during both pump startup and operation which are above the predetermined minimum.

16 Claims, 7 Drawing Sheets

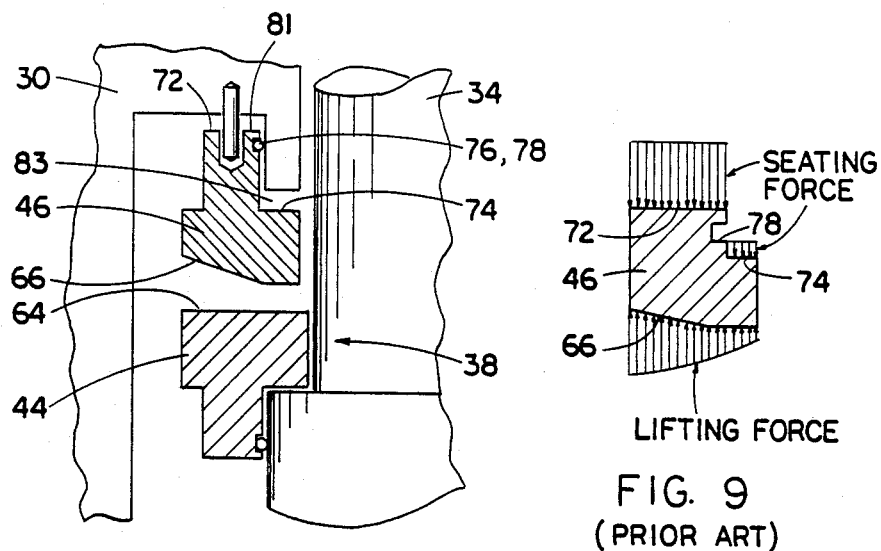
FIG. 8 (PRIOR ART)
FIG. 9 (PRIOR ART)
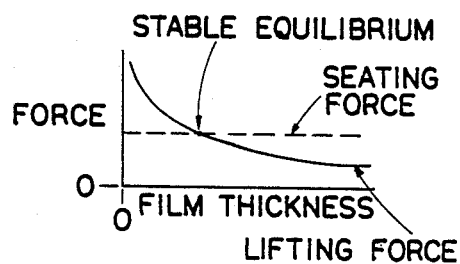
FIG. 10
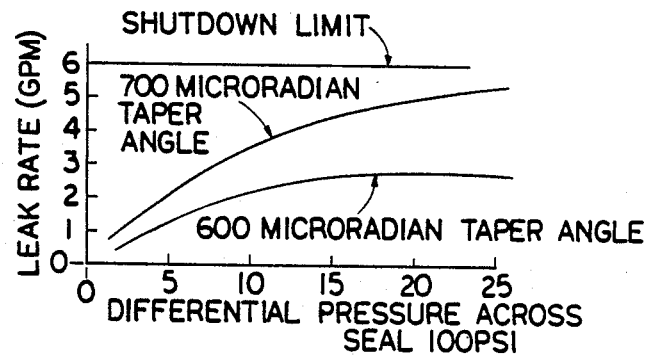
FIG. 11

REACTOR COOLANT PUMP HYDROSTATIC SEALING ASSEMBLY WITH IMPROVED HYDRAULIC BALANCE

CROSS REFERENCE TO RELATED APPLICATIONS

Reference is hereby made to the following copending applications dealing with related subject matter and assigned to the assignee of the present invention:

1. "Sealing Device for the Drive Shaft of a High Pressure Fluid Pump" by N. Bonhomme, assigned U.S. Ser. No. 379,196 and filed May 17, 1982.

2. "Nuclear Reactor Coolant Pump Impeller/Shaft Assembly" by L. S. Jenkins, assigned U.S. Ser. No. 761,447 and filed May 31, 1985, now issued as U.S. Pat. No. 4,690,612 on Sept. 1, 1987.

3. "Improved Shaft Seal" by K. P. Quinn, assigned U.S. Ser. No. 739745 and filed May 31, 1985, now issued as U.S. Pat. No. 4,693,481 on Sept. 15, 1987.

4. "Reactor Coolant Pump Sealing Surface with Titanium Nitride Coating" by D. Boes et al, assigned U.S. Ser. No. 035,832 and filed Apr. 8, 1987.

BACKGROUND OF THE INVENTION

1. Field of the Invention

The present invention relates generally to shaft seals and, more particularly, is concerned with a hydrostatic sealing assembly with improved hydraulic balance useful in sealing a shaft of a reactor coolant pump used in a nuclear power plant.

2. Description of the Prior Art

In pressurized water nuclear power plants, a reactor coolant system is used to transport heat from the reactor core to steam generators for the production of steam. The steam is then used to drive a turbine generator. The reactor coolant system includes a plurality of separate cooling loops, each connected to the reactor core and containing a steam generator and a reactor coolant pump.

The reactor coolant pump typically is a vertical, single stage, centrifugal pump designed to move large volumes of reactor coolant at high temperatures and pressures, for example 550 degrees F. and 2500 psi. The pump basically includes three general sections from bottom to top—hydraulic, shaft seal and motor sections. The lower hydraulic section includes an impeller mounted on the lower end of a pump shaft which is operable within the pump casing to pump reactor coolant about the respective loop. The upper motor section includes a motor which is coupled to drive the pump shaft. The middle shaft seal section includes three tandem sealing assemblies—lower primary, middle secondary and upper tertiary sealing assemblies. The sealing assemblies are located concentric to, and near the top end of, the pump shaft and their combined purpose is to provide for zero reactor coolant leakage along the pump shaft to the containment atmosphere during normal operating condition. Representative examples of pump shaft sealing assemblies known in the prior art are the ones disclosed in U.S. Pat. Nos. to MacCrum (3,522,948), Singleton (3,529,838), Villasor (3,632,117), Andrews et al (3,720,222) and Boes (4,275,891) and in the first three patent applications cross-referenced above, all of which are assigned to the same assignee as the present invention.

The lower primary sealing assembly is the main seal of the pump. It is typically a hydrostatic, radially tapered "film-riding", controlled leakage seal whose primary components are an annular runner which rotates with the pump shaft and a non-rotating seal ring which is attached to the housing of the lower sealing assembly. Representative examples of such hydrostatic seals are the one disclosed hereinafter in thee introductory portion of the detailed description section of the subject application, and the ones disclosed in the third cross-referenced application and in the MacCrum, Singleton, Villasor and Andrews et al patents.

Historically, the pump shaft seals constitute the main problem area for the reactor coolant pumps and significantly contribute to the utilization factor in nuclear power plants. The seals must be capable of breaking down the high system pressure (about 2500 psi) safely. Whereas the tandem arrangement of three seals is used to break down the pressure, the lower main seal absorbs most of the pressure drop (approximately 2250 psi). Being a hydrostatic "film-riding" seal, the lower seal is designed to "lift off" (separate) at low system pressures without pump rotation. The lifting force is produced by a hydrostatic pressure force present in the gap between the stationary seal ring and the rotating runner. A closing or seating force, which must balance the lifting force, is produced by the system pressure acting on surfaces opposite the film surfaces of the seal ring and runner.

One of the potential problems associated with the lower seal stems from the preference to use a very pure grade of aluminum oxide as the faceplate material for the seal ring and runner. Use of such material is advantageous since it is harder than crud particles (usually iron oxide) which are small enough to enter the gap between the faces of the seal ring and runner, but large enough to lodge part way through the gap. However, a major disadvantage of aluminum oxide is that it is basically incompatible in rubbing against itself. If the seal faces momentarily contact while in motion, then usually some damage can be expected. If the rub is heavy enough, the faces are very seriously damaged and in some cases the thermal shock can lead to cracking and breakup of the structure.

For this reason, seal operating limitations and requirements are set very strictly. A minimum differential pressure (200 psi) must be maintained to establish a stable film between the faces and prevent rubbing when starting the pump. A minimum leakrate (0.2 gpm) is required for cooling and, most importantly, as a means of determining that an adequate film thickness exists prior to starting. Clearly the seal is most vulnerable at plant startup since the available differential pressure is low and crud may be present. Once the film is established, however, there is practically no seal face wear and the seal has a very long life expectancy.

Consequently, as long as a film riding seal continues to be preferred and faceplate materials such as aluminum oxide are employed, a need will remain for an effective way to prevent rubbing together of the faces of the seal ring and runner of the lower hydrostatic primary sealing assembly.

SUMMARY OF THE INVENTION

The present invention provides a reactor coolant pump primary sealing assembly designed to satisfy the aforementioned needs. The sealing assembly of the present invention has a pair of hydraulic balance chambers. One of the chambers is connected to a control valve which permits either high pressure fluid on the outer supply pressure side of the seal ring of the assembly or low pressure fluid on the inner low pressure side of the seal ring to act thereon. In such manner, a seating force is imposed on the seal ring which counterbalances an opposite lifting force imposed thereon by the supply pressure alone so as to maintain a leakrate between the seal ring and runner above a predetermined minimum which, in turn, maintains the facing surfaces of the seal ring and runner in noncontacting relationship. In this manner the axial hydrostatic load on the sealing assembly can be significantly increased or decreased by small changes in supply pressure. This is particularly useful in reactor coolant pump shaft seal systems which require relatively high leakrates at low (startup) supply pressures and low leakrates at high (operating) supply pressures.

Accordingly, the present invention is set forth in a pump having a shaft and a housing, with the housing containing pressurized fluid variable in supply pressure between pump startup and pump operation. The present invention is directed to a hydrostatic sealing assembly for sealably and rotatably mounting the shaft within the housing. The sealing assembly comprises: (a) an annular runner circumscribing and mounted around the shaft for rotation therewith; (b) an annular seal ring circumscribing and mounted within the housing in non-rotational relationship thereto but for translatory movement along the shaft; (c) the runner and seal ring having surfaces facing one another and between which the pressurized fluid within the housing creates a flowing film of low pressure fluid which prevents the facing surfaces of the respective runner and seal ring from coming into contact with one another so long as a predetermined minimum leakrate is maintained therebetween; (d) means defining first and second surfaces on the seal ring facing in a direction opposite to that of its facing surface and in sealingly isolated relationship from one another, the first surface being in communication with the pressurized fluid at the supply pressure thereof; and (e) control means disposed in the seal ring and being operable for opening communication of the pressurized fluid at the supply pressure thereof with the seal ring second surface at pump operation and for opening communication of the fluid film at the low pressure thereof with the seal ring second surface at pump startup such that a lifting force imposed on the seal ring facing surface by the pressurized fluid within the housing is effectively balanced by a seating force imposed on the seal ring first and second surfaces at both pump startup and operation so as to produce leakrates between the facing surfaces of the runner and seal ring during both pump startup and operation which are above the predetermined minimum thereof.

More particularly, the first surface of the seal ring defines a substantially larger area than the second surface thereof. Also, the means defining the first and second surfaces on the seal ring includes first and second spaced apart annular seal means disposed along the seal ring between the seal ring and the shaft, and defining first and second chambers disposed contiguous with the first and second isolated surfaces on the seal ring. Thus, the first annular seal means sealingly isolates the first chamber from the second chamber and in communication with the pressurized fluid at the supply pressure. The second annular seal means sealingly isolates the second chamber from the first chamber and the facing surfaces of the runner and the seal ring.

Still further, the control means disposed in the seal ring includes a flow control device movably disposed in the seal ring and being operable between first and second oppositely displaced positions, and a plurality of passages formed in the seal ring. A first of the passages communicates the device with the seal ring second surface, a second of the passages communicates the device with a side of the seal ring at the supply pressure, and a third of the passages communicates the device with an opposite side of the seal ring at the low pressure. When the flow control device is displaced at its first position, communication is opened between the low pressure and the seal ring second surface, whereas when the flow control device is displaced at its second position, communication is opened between the supply (higher) pressure and the seal ring second surface. The flow control device is biased to automatically move to its first position when the supply pressure of the pressurized fluid is below a preset pressure at pump startup, and is movable to its second position when the supply pressure of the pressurized fluid rises above the preset pressure at pump operation. By way of example, the flow control device can be a spool or poppet valve.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 8 is a simplified schematic representation of the lower primary sealing assembly of the prior art reactor coolant pump of FIG. 4, illustrating the tapered convergent flow path between the seal ring and runner of the primary sealing assembly.

FIG. 9 is a schematic representation of the seal ring of the prior art primary sealing assembly of FIG. 8, illustrating the areas thereon at which are applied opposing lifting and seating forces.

FIG. 10 is a graph demonstrating the relationships between film thickness, lifting force and seating force produced by the prior art primary sealing assembly of FIG. 8.

FIG. 11 is a graph demonstrating the effect on leakage rate across the entire pressure range of the prior art primary sealing assembly of increasing the convergence angle of the faceplate on the seal ring from a 600 to a 700 microradian taper angle.

DETAILED DESCRIPTION OF THE INVENTION

Figure 1:
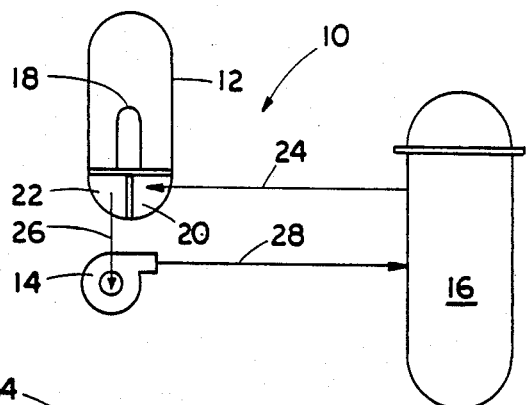
FIG. 1 is a schematic representation of one cooling loop of a conventional nuclear reactor coolant system which includes a steam generator and a reactor coolant pump connected in series in a closed coolant flow circuit with the reactor core.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

PRIOR ART REACTOR COOLANT PUMP

Referring now to the drawings, and particularly to FIG. 1, there is shown a schematic representation of one of a plurality of cooling loops 10 of a conventional nuclear reactor coolant system. The cooling loop 10 includes a steam generator 12 and a reactor coolant pump 14 serially connected in a closed coolant flow circuit with a nuclear reactor core 16. The steam generator 12 includes primary tubes 18 communicating with inlet and outlet plenums 20,22 of the generator. The inlet plenum 20 of the steam generator 12 is connected in flow communication with the outlet of the reactor core 16 for receiving hot coolant therefrom along flow path 24 of the closed flow circuit. The outlet plenum 22 of the steam generator 12 is connected in flow communication with an inlet suction side of the reactor coolant pump 14 along flow path 26 of the closed flow circuit. The outlet pressure side of the reactor coolant pump 14 is connected in flow communication with the inlet of the reactor core 16 for feeding cold coolant thereto along flow path 28 of the closed flow circuit.

In brief, the coolant pump 14 pumps the coolant under high pressure about the closed flow circuit. Particularly, hot coolant emanating from the reactor core 16 is conducted to the inlet plenum 20 of the steam generator 12 and to the primary tubes 18 in communication therewith. While in the primary tubes 18, the hot coolant flows in heat exchange relationship with cool feedwater supplied to the steam generator 12 via conventional means (not shown). The feedwater is heated and portions thereof changed to steam for use in driving a turbine generator (not shown). The coolant, whose temperature has been reduced by the heat exchange, is then recirculated to the reactor core 16 via the coolant pump 14.

The reactor coolant pump 14 must be capable of moving large volumes of reactor coolant at high temperatures and pressures about the closed flow circuit. Although, the temperature of the coolant flowing from the steam generator 12 to the pump 14 after heat exchange has been cooled substantially below the temperature of the coolant flowing to the steam generator 12 from the reactor core 16 before heat exchange, its temperature is still relatively high, being typically about 550 degrees F. The coolant pressure produced by the pump is typically about 2500 psi.

Figure 2:
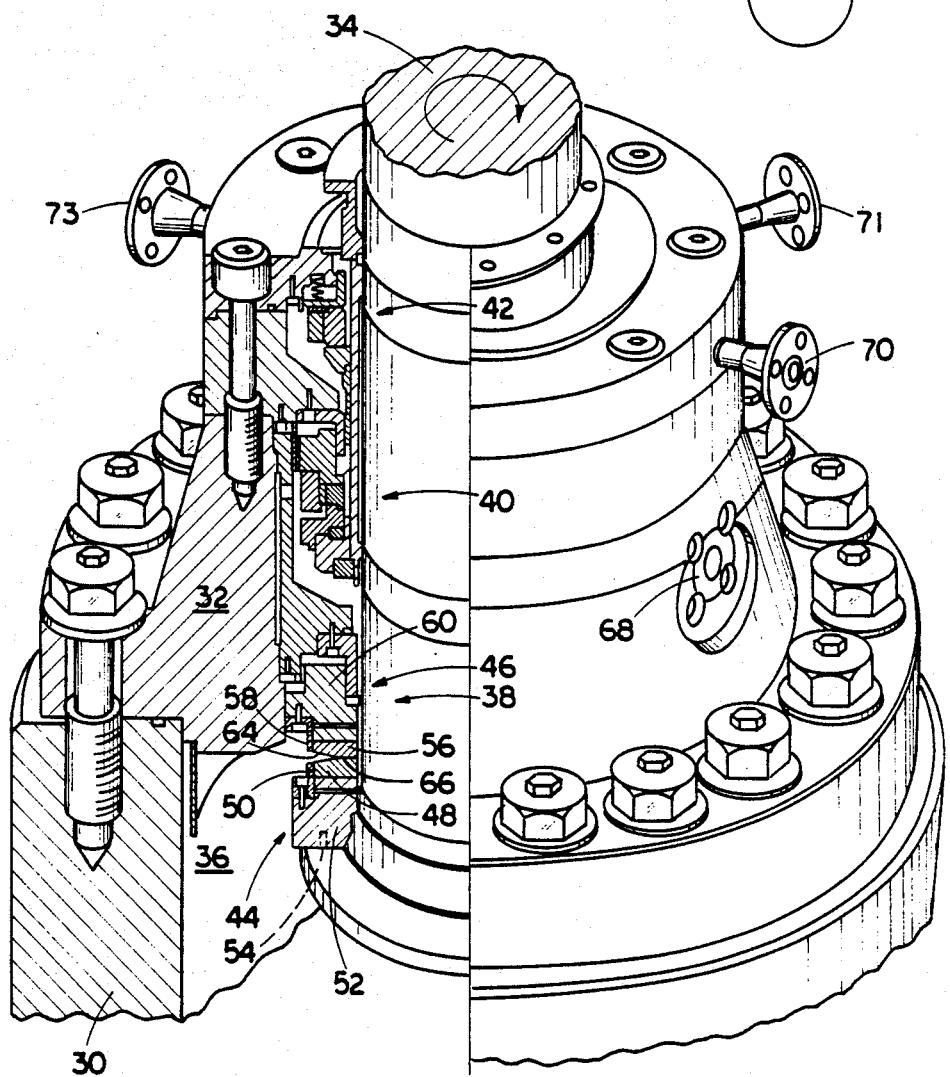
FIG. 2 is a cutaway perspective view of the shaft seal section of the prior art reactor seal housing, illustrating in cross-section the seal housing and the lower primary, middle secondary and upper tertiary sealing assemblies which are disposed within the bearing assembly and surround the pump shaft in this section of the pump.
Figure 3:
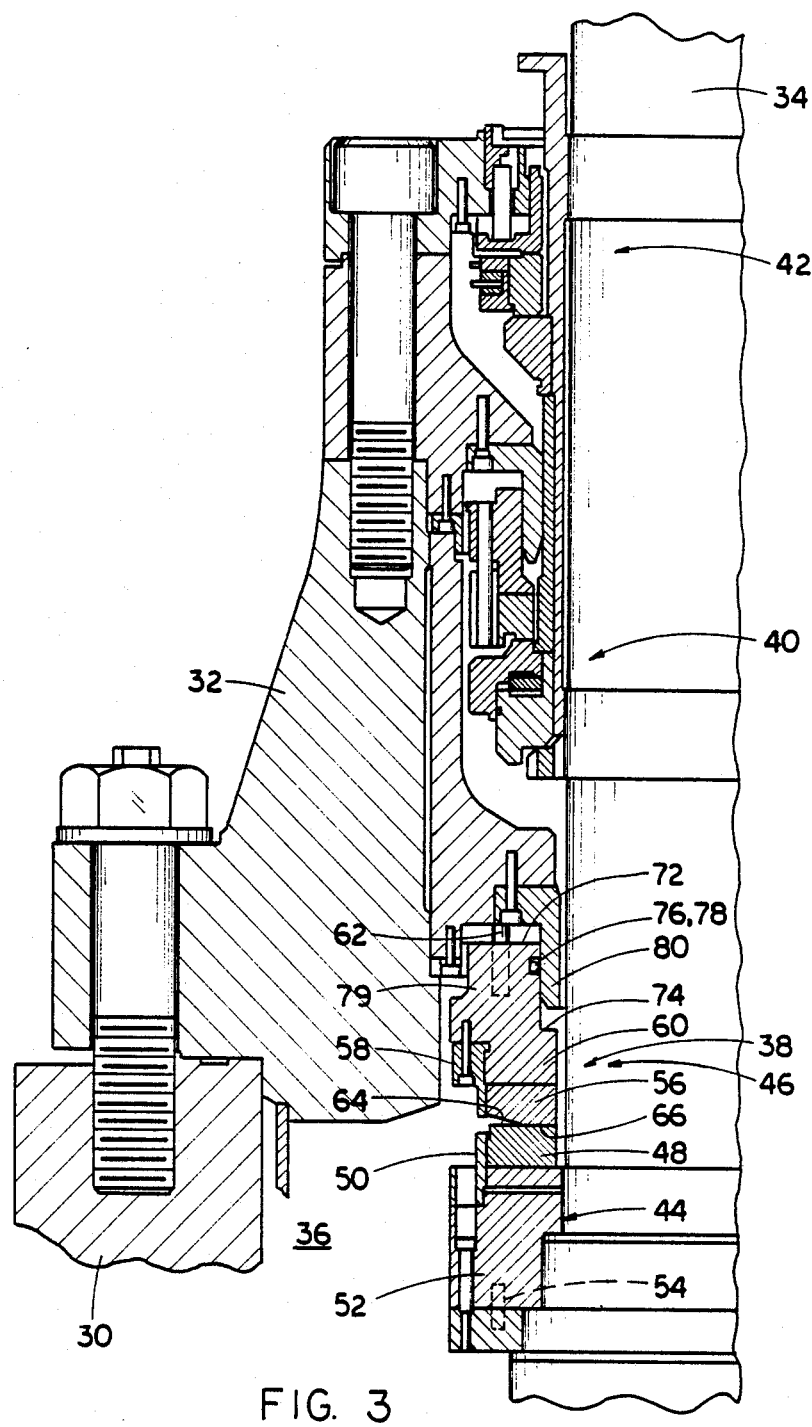
FIG. 3 is an enlarged view of the crosssectioned seal housing and sealing assemblies of the prior art reactor coolant pump of FIG. 2.

As seen in FIGS. 2 and 3, the prior art reactor coolant pump 14 generally includes a pump housing 30 which terminates at one end in a seal housing 32. The pump 14 also includes a pump shaft 34 extending centrally of the housing 30 and being sealingly and rotatably mounted within the seal housing 32. Although not shown, the bottom portion of the pump shaft 34 is connected to an impeller, while a top portion thereof is connected to a high-horsepower, induction-type electric motor. When the motor rotates the shaft 34, the impeller within the interior 36 of the housing 30 circulates the coolant flowing through the pump housing 30 at pressures from ambient to approximately 2500 psi cover gas. This pressurized coolant applies an upwardly directed, hydrostatic load upon the shaft 34 since the outer portion of the seal housing 32 is surrounded by the ambient atmosphere.

In order that the pump shaft 34 might rotate freely within the seal housing 32 while maintaining the 2500 psi pressure boundary between the housing interior 36 and the outside of the seal housing 32, tandemly-arranged lower primary, middle secondary and upper tertiary sealing assemblies 38,40,42 are provided in the positions illustrated in FIGS. 2 and 3 about the pump shaft 34 and within the pump housing 30. The lower primary sealing assembly 38 which performs most of the pressure sealing (approximately 2250 psi) is of the non-contacting hydrostatic type, whereas the middle secondary and upper tertiary sealing assemblies 40,42 are of the contacting, mechanical type.

Figure 4:
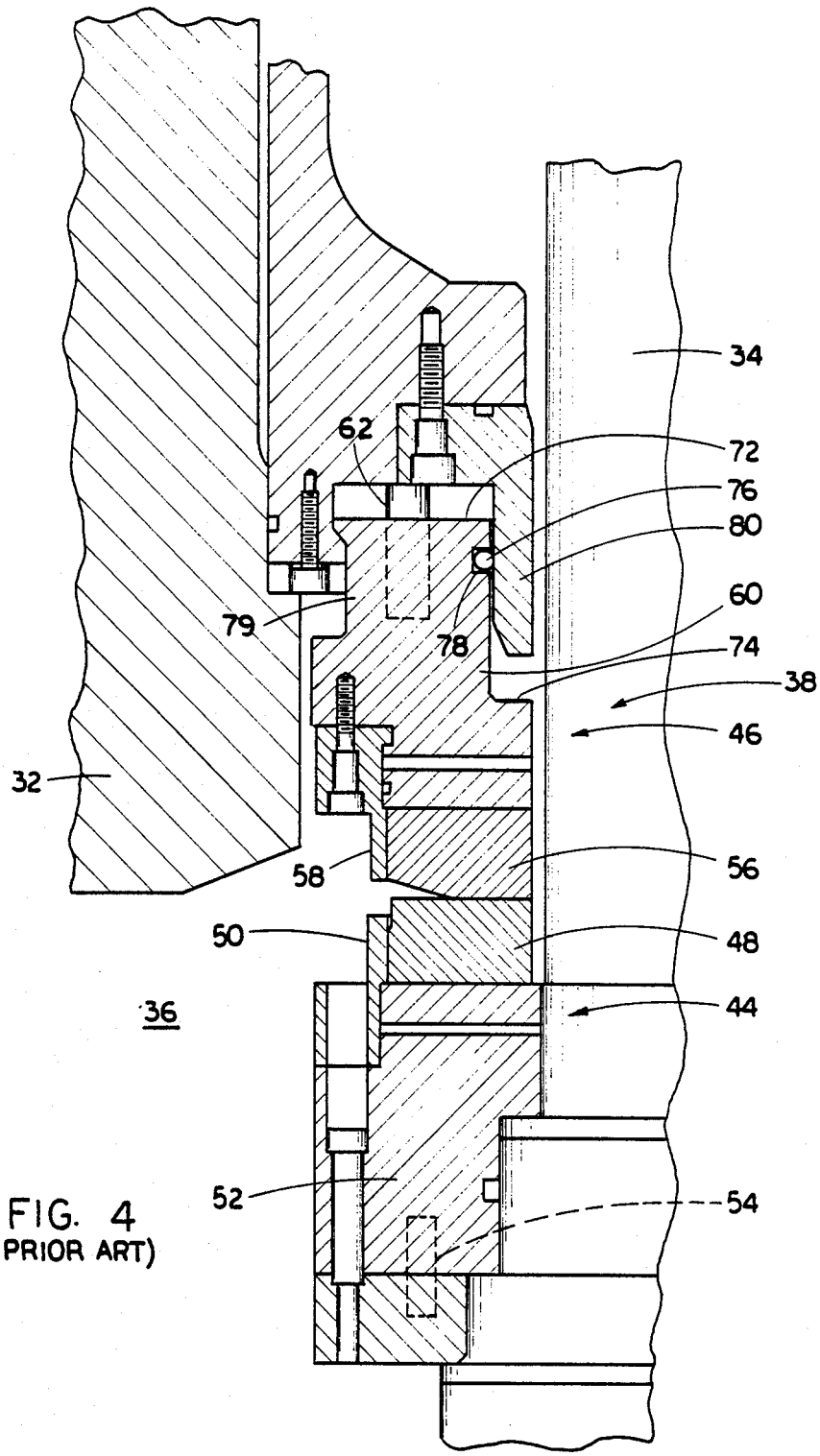
FIG. 4 is an enlarged cross-sectional view of the lower primary sealing assembly and a portion of the bearing assembly of the prior art reactor coolant pump as seen in FIG. 3.

As more clearly seen in FIG. 4, the lower hydrostatic primary sealing assembly 38 of the prior art pump 14 generally includes an annular runner 44 which is mounted to the pump shaft 34 for rotation therewith and an annular seal ring 46 which is stationarily mounted within the seal housing 32. The runner 44 includes an annular runner faceplate 48 mounted by a hydrostatic clamp ring 50 to an annular runner support member 52 which, in turn, is keyed to the pump shaft 34 by anti-rotation pins 54. The seal ring 46 includes an annular ring faceplate 56 mounted by a hydrostatic clamp ring 58 to an annular ring support member 60 which, in turn, is keyed to the seal housing 32 by antirotation pin 62 so as to prevent rotational movement of the seal ring 46 relative to the seal housing 32 but allow translatory movement of the seal ring 46 along pump shaft 34 toward and away from the runner 44.

Facing (or top and bottom) surfaces 64,66 of the respective runner and ring faceplates 48,56 are biased toward one another as a result of the coolant pressure load on the pump shaft 34. However, the surfaces 64,66 normally do not frictionally engage one another, since the surface 66 of the seal ring faceplate 56 is tapered at a shallow angle with respect to the substantially flat and horizontal surface 64 on the runner faceplate 48. Such tapering provides a flowing film of coolant fluid between the surfaces 64,66 which, in turn, allows the runner 44 and seal ring 46 to rotate relative to one another in a "film-riding" mode.

Because the primary sealing assembly 38 normally operates in a film-riding mode, some provision must be made for handling coolant fluid which "leaks off" in the annular space between the seal housing 32 and the shaft 34 rotatably mounted thereto and enters through injection supply port 73. Accordingly, the seal housing 32 includes a primary leakoff port 68, whereas leakoff port 70 accommodates coolant fluid leakoff from the secondary sealing assembly 40 and leakoff port 71 accommodates coolant fluid leakoff from the tertiary sealing assembly 42.

As schematically depicted in FIG. 8, the facing surfaces 64,66 of the respective runner 44 and seal ring 46 of the primary sealing assembly 38 are designed to "lift off" or separate at low system pressure without pump shaft rotation. The lifting force is produced by the hydrostatic pressure force between the runner 44 and seal ring 46. As seen in FIG. 9, an opposing seating force, which must balance the lifting force, is produced by the system pressure acting on a pair of adjacent outer and inner peripheral upwardly-facing facing surfaces 72,74 of the seal ring 46 located on an opposite side thereof from its downwardly-facing surface 66. The lifting force, graphically depicted in FIG. 10, varies inversely with film thickness between the facing surfaces 64,66 of the runner 44 and seal ring 46. So where the ring 46 is tapered with a convergent flow path, the lifting force will decrease as the film thickness increases.

This should result in a stable equilibrium condition seen in FIG. 10 because (1) there is only one film thickness value which will produce a lifting force exactly equal and opposite to the hydrostatic seating force which exists on the opposite side of the seal ring 46 and (2) changes in seating force will always produce a comparable change in film thickness and lifting force. In the design of FIG. 8, hydrostatic loading at the balance diameter of the seal ring 46 is ensured by an O-ring 76 seated within an annular groove 78 which circumscribes the inner diameter of an upper portion of the seal ring 46. The O-ring 76 allows the seal ring 46 to vertically ride on a cylindrical wear sleeve 80 which forms part of the seal housing 32 of the coolant pump 14 in order for the seal ring to adjust to pump shaft motion and pressure changes. The seal provided by the O-ring 76 not only prevents leakage, but also serves to determine the magnitude of the seating force. The O-ring 76 defines an upper chamber 81 which communicates with system pressure fluid and a lower chamber 83 which communicates with low pressure fluid emanating from the flow of fluid film into the gap between the facing surfaces 64,66. The inner diameter of the upper portion of seal ring 46 determines the position of transition from high system pressure to low back pressure and thus determines the magnitude of the pressure component of the seating force in FIG. 10. The seating force is quite sizable. At full system pressure, it is nearly equal to 100,000 lbs.

As mentioned previously, to prevent corrosion, erosion and wear, the material of the faceplates 48,56 in FIG. 4 is preferably aluminum oxide. However, since this material can be damaged if rub against itself, a minimum differential pressure (approximately 200 psi) must be maintained to establish a stable film and prevent rubbing when starting the pump 14. Clearly, the seal provided between the faceplates is most vulnerable at startup since the available differential pressure is low and the sealing film must be established to prevent rubbing of the facing surfaces 64,66.

At startup, the resulting leakage is an order of magnitude less than at full pressure. The required minimum leakage to startup (0.2 gpm) can, in fact, be too small to accurately measure with the instruments that are presently used in reactor power plants. Because low leakage can be an indication of possible crud blockage at the facing surfaces 64,66 or failure of the surfaces to separate, operators are reluctant to start the pump to avoid damaging the facing surfaces of the primary sealing assembly 38. In a high percentage of cases, the low leakrates are simply due to unreliable instrumentation. To correct the problem or confirm the lack of a problem, operators conduct a number of involved system checks. The effort is time consuming and a continuing nuisance in an operation where the pumps represent a small part of the startup logistics.

To compensate for the low leakage problem, seal designers can open up the seal faceplate convergence angle (taper). However, as can be understood from the graph in FIG. 11, this would result in high leakrates across the entire pressure range. The primary disadvantage with this technique is at high system pressure where the resulting leakrates approach and may exceed shutdown limits the increased convergence angle (taper) is, in fact, opposite to what seal designers would prefer to introduce were it not for the low pressure leakage requirement. A reduction in the convergence angle (taper) would reduce the high pressure leakrates and provide significantly more margin to shutdown limits, but this would introduce leakrates below the minimum acceptable at low system pressures (i.e., 0.2 gpm at 200 psig).

MODIFIED REACTOR COOLANT PUMP OF THE PRESENT INVENTION

Ideally, the solution to the problem is a seal which maintains a constant leakage over the pressure range. To accomplish this, either the convergence angle (taper) or seating force would have to change in a controlled manner over the entire system pressure range. Varying either one of these parameters in a controlled fashion becomes a very difficult and complex challenge. A more practical and relatively simple alternative is proposed by the present invention.

Figure 5:
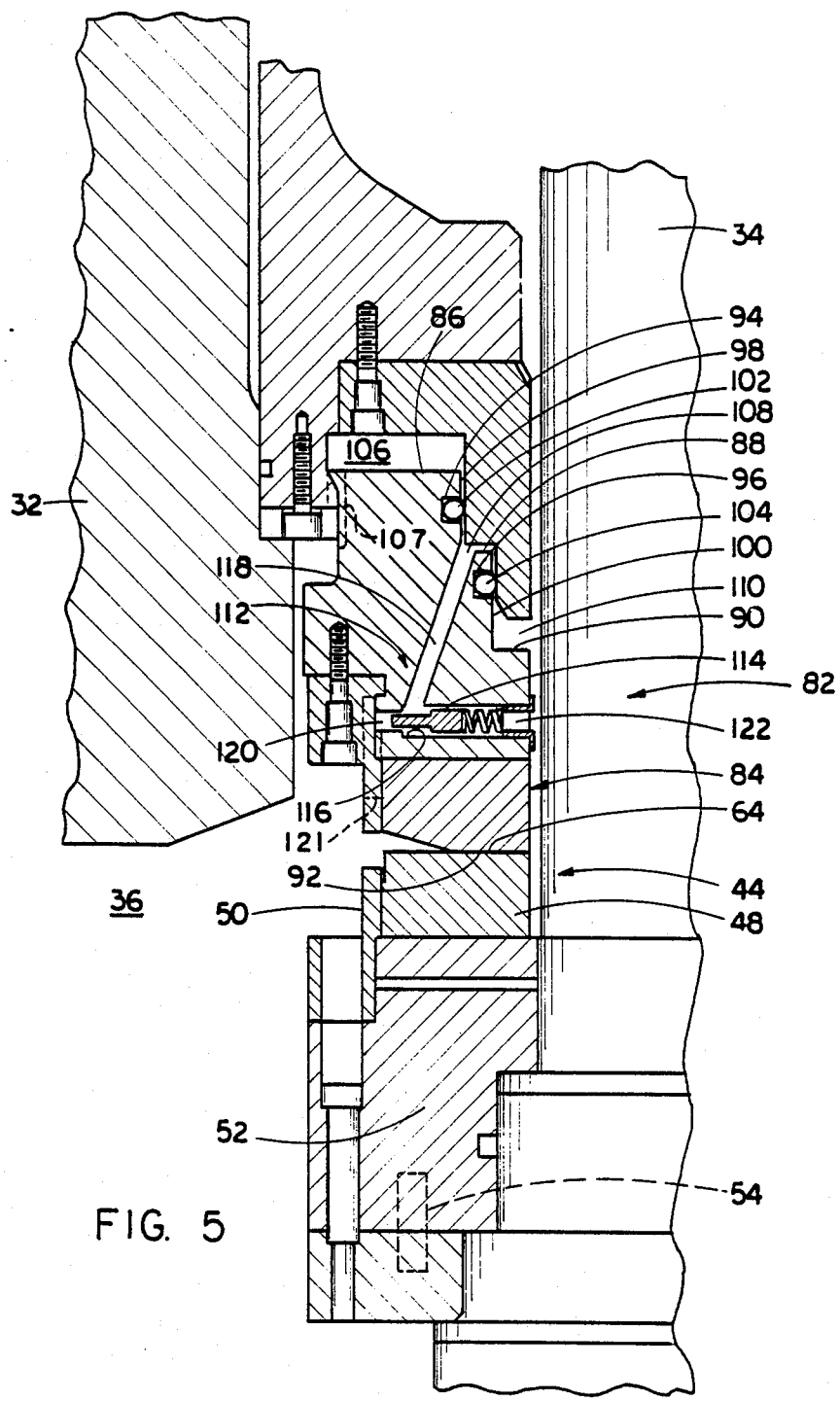
FIG. 5 is a cross-sectional view similar to that of FIG. 4, but illustrating the lower primary sealing assembly of a reactor coolant pump after modification in accordance with the principles of the present invention to incorporate therein a second balance chamber, fluid flow passages and a control valve.
Figure 12:
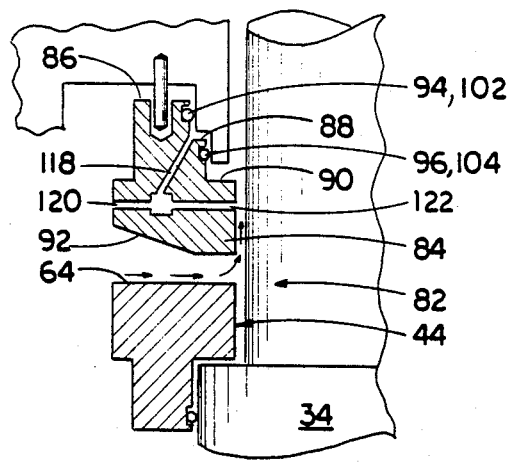
FIG. 12 is a simplified schematic representation of the lower primary sealing assembly of the reactor coolant pump of FIG. 5 modified in accordance with the principles of the present invention.

Turning now to FIGS. 5 and 12, there is shown the modified primary sealing assembly of the present invention, being generally designated by the numeral 82. Only the parts of the modified primary sealing assembly 82 which are different from the prior art primary sealing assembly 38, and thus relate to the modifications underlying the present invention, will be described in detail hereafter and be identified by different reference numerals.

The modified primary sealing assembly 82 includes a modified ring seal 84 having first, second and third annular peripheral upper surfaces 86,88,90 facing in a direction opposite to that of its bottom surface 92 which faces the adjacent top surface 64 of the faceplate 48 of the runner 44. The respective peripheral upper surfaces 86,88,90 are sealingly isolated from one another by first and second annular seal means in the form of a pair of grooves 94,96 defined respectively in a pair of radially spaced vertical surfaces 98,100 located at inside diameters of the seal ring 84 and a pair of O-rings 102,104 disposed in the respective pair of grooves 94,96. The vertical surfaces 98,100 extend transversely between and interconnect the respective peripheral surfaces 86,88,90, as seen in FIGS. 5 and 12.

Thus, the one upper groove 94 and associated O-ring 102 which comprise the first or upper annular seal means are disposed along the seal ring 84 between it and the shaft 34 and between the first and second peripheral upper surfaces 86,88 thereon. In such manner, a first or upper balance chamber 106 is defined contiguous with the first peripheral surface 86 which communicates with the pressurized fluid in the housing 30 at the supply pressure thereof via channel 107. On the other hand, the other lower groove 96 and associated O-ring 104 which comprise the second or lower annular seal means are likewise disposed along the seal ring 84 between it and the shaft 34, but between the second and third peripheral upper surfaces 88,90 thereon. Now, a second or middle balance chamber 108 is defined contiguous with the second peripheral surface 88, and a third or lower balance chamber 110 is defined contiguous with the third peripheral surface 90 which communicates with the fluid film that flows between the facing surfaces 64,92 of the runner 44 and seal ring 84 at the low pressure thereof. Thus, the first, second and third balance chambers 106,108,110 are defined by the first and second annular seal means in substantially noncommunicative isolated relationship to one another. It will be observed that the first balance surface 86 covers a substantially larger are than either the second or third surfaces 88,90 so that a large proportion of the seating force will be produced at the first surface 86 in response to the supply pressure of the pressurized fluid in the housing 30.

The modified primary sealing assembly 82 further includes control means, generally indicated by 112, disposed in the modified seal ring 84. The control means 112 includes a flow control device 114 movably disposed in an internal cylindrical cavity 116 formed in the modified seal ring 84, and a plurality of passages 118,120,122 formed in the seal ring. The first passage 118 extends and establishes communication between the second surface 88 on the seal ring 84 in the middle balance chamber 108 and the cavity 116 and thus the flow control device 114 located in the cavity. The second passage 120 extends and establishes communication between the outer diameter side of the modified seal ring 84 at the pressurized fluid supply pressure via channel 121 and the cavity 116 and thus the flow control device 114. The third passage 122 extends and establishes communication between an opposite innermost diameter side of the seal ring 84 at the fluid film low pressure and the cavity 116 and thus the flow control device 114.

Figure 6:
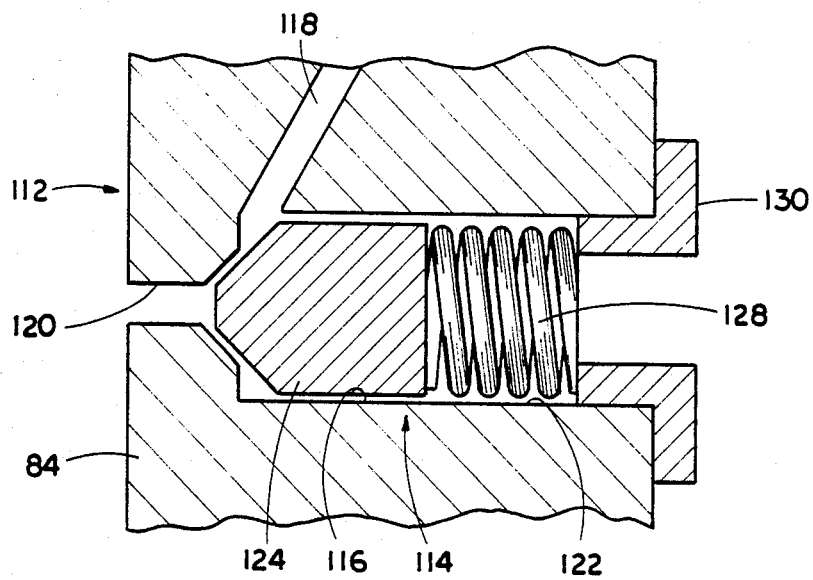
FIG. 6 is an enlarged cross-sectional view of a fragmentary portion of the lower primary sealing assembly of FIG. 5, illustrating the preferred embodiment of the control valve incorporated therein being in the form of a poppet valve.
Figure 7:
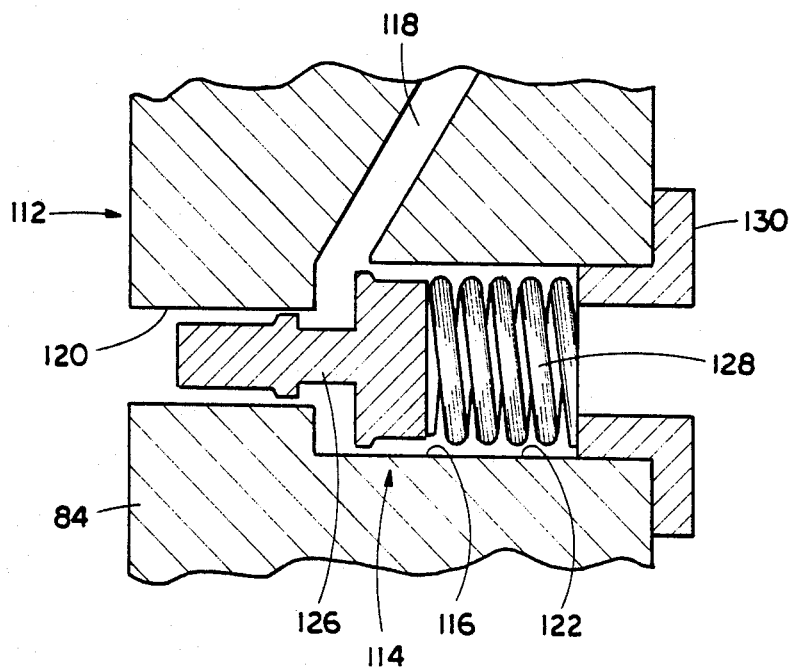
FIG. 7 is another enlarged cross-sectional view similar to that of FIG. 6, but illustrating an alternative embodiment of the control valve being in the form of a spool valve.

The flow control device 114 can move between first and second oppositely displaced positions, either by movement radially in the direction of the innermost diameter side of the seal ring 84 or oppositely in the direction of the outer diameter side thereof. When the flow control device 14 is displaced at its first position, communication is opened between the pressurized fluid supply pressure and the seal ring second surface 88 and middle balance chamber 108. On the other hand, when the flow control device 114 is displaced at its second position, communication is opened between fluid film low pressure and the seal ring second surface 88 and middle balance chamber 108. the flow control device 114 can take any suitable form, two examples of which are a poppet valve 124 illustrated in FIG. 6, and a spool valve 126 illustrated in FIG. 7. The valve 124,126 is biased by a spring 128, being anchored by a sleeve 130 secured to the seal ring 84 at the opening of the third passage 122, to move left to its first position (as seen respectively in FIGS. 6 and 7) when the supply pressure of the pressurized fluid, being communicated to the valve through the second passage 120, is below a preset pressure at pump startup. The preset pressure at which the valve changes its position (for instance, being approximately 400 to 500 psig) is determined by using a spring 128 which has the desired deflection rate. Then, when the pressurized fluid supply pressure rises above the preset pressure as the pump 14 is actuated toward full operation, the supply pressure on the valve 124,126 overcomes the bias of the spring 128 and caused the valve to move right to its second position.

In such manner, the flow control device 114 when at its first position at pump startup opens communication via the first and third passages 118,122 between the low pressure fluid film and the second or middle balance chamber 108 (in the case of poppet valve 124, leakage is provided between it and the wall of the cavity 116) and closes communication of the pressurized fluid, being at a low supply pressure below the preset pressure, with the second balance chamber 108 via the first and second passages 118,120. On the other hand, the flow control device 114 when at its second position at normal pump operation closes communication via the first and third passages 118,122 between the low pressure fluid film and the second balance chamber 108 and opens communication of the pressurized fluid, now being at a high supply pressure above the preset pressure, with the second balance chamber 108 via the first and second passages 118,120.

Figure 13:
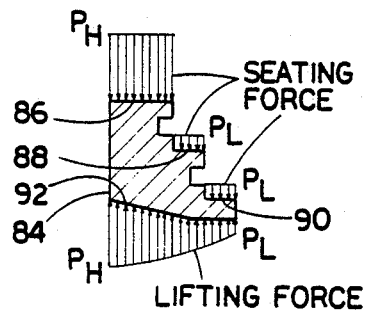
FIGS. 13 and 14 are schematic representations of the seal ring of the modified primary sealing assembly of FIG. 12, illustrating the areas thereon at which are applied opposing lifting and sealing forces respectively when lower and high pressure is communicated to the second balance chamber provided in the modified primary sealing assembly.
Figure 14:
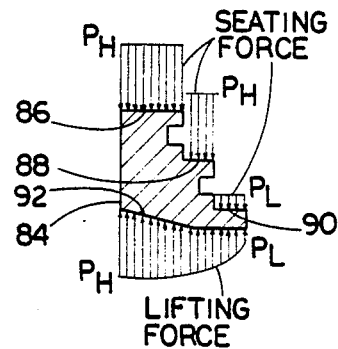
Figure 15:
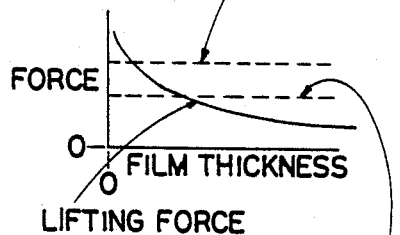
FIG. 15 is a graph demonstrating the relationships between film thickness, lifting force and seating force produced by the modified primary sealing assembly of FIG. 8.
Figure 16:
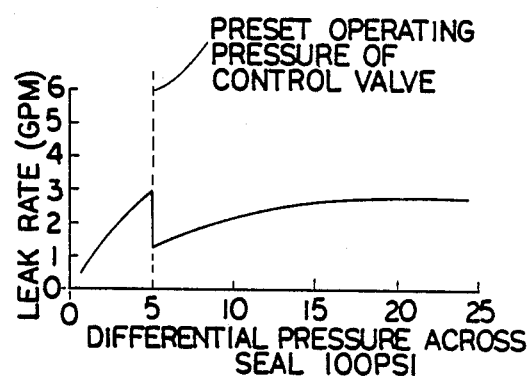
FIG. 16 is a graph demonstrating the effect on leakage rate across the entire pressure range of the modified primary sealing assembly of operation of the control valve of the modified primary sealing assembly in accordance with the principles of the present invention.

From FIGS. 13 and 14, it will be understood that the proportion of the combined areas of surfaces 86,88,90 subjected to high pressure at pump startup is less than at normal pump operation. This results in the lifting force imposed on the end facing surface 82 of the modified seal ring 84 by the pressurized fluid within the housings 30,32 being effectively balanced by a seating force imposed on the first, second and third peripheral surfaces 86,88,90 of the modified seal ring 84 at both pump startup and normal operation. The net result as the pump goes from startup to full operation is an increasingly greater seating force and smaller film thickness as illustrated in FIG. 15. Relatively high leakrates are thus produced between the facing surfaces 64,96 of the runner 44 and seal ring 84 at low supply pressures during pump startup and low leakrates at high supply pressures during pump operation which leakrates are all above the predetermined minimum required to maintain the facing surfaces in noncontacting relationship. A small change in the seating force can produce large changes in leakrate because, for a given pressure differential across the facing surfaces 64,92, the leakrate varies with the cube of the film thickness. By carefully selecting the sizes of the areas of the balance surfaces, the maximum leakrate with the flow control device 114 at its first position (and the middle balance chamber 108 at low pressure) can be established to be about the same as the leakrate at the maximum system pressure condition with the flow control device 114 at its second position (and the middle balance chamber 108 at high system or supply pressure). The resulting leakrate profile would appear similar to that shown in FIG. 16.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. In a pump having a shaft and a housing, said housing containing pressurized fluid variable in supply pressure between pump startup and pump operation, a hydrostatic sealing assembly for sealably and rotatably mounting said shaft within said housing, said sealing assembly comprising:
   (a) an annular runner circumscribing and mounted around said shaft for rotation therewith;
   (b) an annular seal ring circumscribing and mounted within said housing in non-rotational relationship thereto but for translatory movement along said shaft;
   (c) said runner and seal ring having surfaces facing one another and between which the pressurized fluid within said housing creates a flowing film of low pressure fluid which prevents said facing surfaces of said respective runner and seal ring from coming into contact with one another so long as a predetermined minimum leakrate is maintained therebetween;
   (d) means defining first and second surfaces on said seal ring facing in a direction opposite to that of its facing surface and in sealingly isolated relationship from one another, said first surface being in communication with the pressurized fluid at said supply pressure thereof; and
   (e) control means disposed in said seal ring and being operable for opening communication of the pressurized fluid at said supply pressure thereof with said seal ring second surface at pump operation and for opening communication of the fluid film at said low pressure thereof with said seal ring second surface at pump startup such that a lifting force imposed on said seal ring facing surface by the pressurized fluid within said housing is effectively balanced by a seating force imposed on said seal ring first and second surfaces at both pump startup and operation so as to produce leakrates between said facing surfaces of said runner and seal ring during both pump startup and operation which are above said predetermined minimum thereof.

2. The sealing assembly as recited in claim 1, wherein said first surface of said seal ring defines a substantially larger area than said second surface thereof.

3. The sealing assembly as recited in claim 1, wherein said means defining said first and second surfaces on said seal ring includes first and second spaced apart annular seal means disposed along said seal ring between said seal ring and said shaft.

4. The sealing assembly as recited in claim 3, wherein said first and second spaced apart annular seal means define first and second chambers disposed contiguous with said first and second isolated surfaces on said seal ring.

5. The sealing assembly as recited in claim 4, wherein said first annular seal means sealingly isolates said first chamber from said second chamber and in communication with the pressurized fluid at said supply pressure.

6. The sealing assembly as recited in claim 4, wherein said second annular seal means sealingly isolates said second chamber from said facing surfaces of said runner and seal ring.

7. The sealing assembly as recited in claim 1, wherein said control means disposed in said seal ring includes:
   a flow control device movably disposed in said seal ring and being operable between first and second oppositely displaced positions; and
   a plurality of passages formed in said seal ring, a first of said passages communicating said device with said seal ring second surface, a second of said passages communicating said device with a side of said seal ring at said supply pressure and a third of said passages communicating said device with an opposite side of said seal ring at said low pressure of said fluid film, such that, when said flow control device is displaced at its first position, communication is opened between said low pressure and said seal ring second surface, whereas when said flow control device is displaced at its second position, communication is opened between said supply pressure and said seal ring second surface.

8. The sealing assembly as recited in claim 7, wherein said flow control device is biased to automatically move to its first position when said supply pressure of the pressurized fluid is below a preset pressure at pump startup, said flow control device being movable to its second position when said supply pressure of the pressurized fluid rises above said preset pressure at pump operation.

9. The sealing assembly as recited in claim 7, wherein said flow control device is a spool valve.

10. The sealing assembly has recited in claim 7, wherein said flow control device is a poppet valve.

11. In a pump having a shaft and a housing, said housing containing pressurized fluid variable between a low supply pressure at pump startup and a high supply pressure at pump operation, a hydrostatic sealing assembly for sealably and rotatably mounting said shaft within said housing, said sealing assembly comprising:
   (a) an annular runner circumscribing and mounted around said shaft for rotation therewith;
   (b) an annular seal ring circumscribing and mounted within said housing in non-rotational relationship thereto but for translatory movement along said shaft and said housing;
   (c) said runner and seal ring having annular surfaces on adjacent ends thereof facing one another and between which the pressurized fluid within said housing creates a flowing film of low pressure fluid which prevents said facing surfaces of said respective runner and seal ring from coming into contact with one another so long as a predetermined minimum leakrate is maintained therebetween;

(d) said seal ring having first, second and third annular peripheral surfaces facing in a direction opposite to that of its end surface;

(e) first annular seal means disposed between said seal ring and said shaft and along said seal ring between said first and second peripheral surfaces thereon so as to define a first chamber contiguous with said first peripheral surface of said seal ring which communicates with said pressurized fluid at said supply pressure thereof;

(f) second annular seal means disposed between said seal ring and said shaft and along said seal ring between said second and third peripheral surfaces thereon so as to define a second chamber contiguous with said second peripheral surface of said seal ring and a third chamber contiguous with said third peripheral surface of said seal ring, said third chamber communicating with said fluid film which flows between said facing surfaces of said runner and seal ring at said low pressure thereof;

(g) said first, second and third chambers being defined by said first and second annular seal means in substantially non-communicative isolated relationship to one another; and (h) control means disposed in said seal ring and being operable for closing communication of said fluid film at said low pressure thereof with said second chamber and opening communication of said pressurized fluid at said low supply pressure thereof with said second chamber at pump operation, said control means also being operable for opening communication of said fluid film at said low pressure thereof with said second chamber and closing communication of said pressurized fluid at said high supply pressure thereof with said second chamber at pump startup such that a lifting force imposed on said end surface of said seal ring by the pressurized fluid within said housing is effectively balanced by a seating force imposed on said first, second and third peripheral surfaces of said seal ring at both pump startup and operation so as to produce relatively high leakrates between said facing surfaces at low supply pressures during pump startup and low leakrates at high supply pressures during pump operation which leakrates are all above said predetermined minimum thereof.

12. The sealing assembly as recited in claim 11, wherein said first annular peripheral surface defines a substantially larger area than either said second or third peripheral surfaces.

13. The sealing assembly as recited in claim 11, wherein said control means disposed in said seal ring includes:

a flow control device movably disposed in said seal ring and being operable between first and second oppositely displaced positions; and a plurality of passages formed in said seal ring, a first of said passages communicating said device with said seal ring second surface, a second of said passages communicating said device with a side of said seal ring at said pressurized fluid supply pressure and a third of said passages communicating said device with an opposite side of said seal ring at said fluid film low pressure, such that, when said flow control device is displaced to its first position, communication is opened between said low pressure and said seal ring second surface, whereas when said flow control device is displaced to its second position, communication is opened between said supply pressure and said seal ring second surface.

14. The sealing assembly as recited in claim 13, wherein said flow control device is biased to automatically move to its first position when said supply pressure of the pressurized fluid is below a preset pressure at pump startup, said flow control device being movable to its second position when said supply pressure of the pressurized fluid rises above said preset pressure at pump operation.

15. The sealing assembly as recited in claim 13, wherein said flow control device is a spool valve.

16. The sealing assembly as recited in claim 13, wherein said flow control device is a poppet valve.

* * * * *